(12) United States Patent
Li

(10) Patent No.: US 11,686,910 B1
(45) Date of Patent: Jun. 27, 2023

(54) WALL BOXES FOR INDOOR AND OUTDOOR

(71) Applicant: Huizhou Fibercan Industrial Co., Ltd, Huizhou (CN)

(72) Inventor: Yaole Li, Huizhou (CN)

(73) Assignee: Huizhou Fibercan Industrial Co., Ltd, Huizhou (CN)

(*) Notice: Subject to any disclaimer, the term of this patent is extended or adjusted under 35 U.S.C. 154(b) by 0 days.

(21) Appl. No.: 17/741,360

(22) Filed: May 10, 2022

(30) Foreign Application Priority Data

Apr. 25, 2022 (CN) .......................... 202210437142.9

(51) Int. Cl.
*G02B 6/44* (2006.01)
(52) U.S. Cl.
CPC ............ *G02B 6/4444* (2013.01); *G02B 6/445* (2013.01)
(58) Field of Classification Search
CPC ................................ G02B 6/445; G02B 6/4444
See application file for complete search history.

(56) References Cited

U.S. PATENT DOCUMENTS

| | | | | |
|---|---|---|---|---|
| 2011/0293277 A1* | 12/2011 | Bradea | ................... | G02B 6/445 398/66 |
| 2013/0114930 A1* | 5/2013 | Smith | ................... | G02B 6/4471 385/76 |
| 2017/0269324 A1* | 9/2017 | Im | ........................ | G02B 6/4454 |
| 2021/0096315 A1* | 4/2021 | Hill | ....................... | G02B 6/4454 |

* cited by examiner

*Primary Examiner* — Chris H Chu
(74) *Attorney, Agent, or Firm* — Georgi Korobanov

(57) ABSTRACT

A wall box for indoor and outdoor, comprising a box body, a box cover and a cable reversing structure for fixing on the wall. Wire inlet holes and wire outlet holes are arranged on both sides of the box body, the wire inlet hole is equipped with an optical fiber connector for receiving signals, and the wire outlet hole is equipped. with an adapter for receiving signals. An accommodating cavity is formed inside the box body, which is provided with a first opening on the upper part of the accommodating cavity and is covered on the upper side of the first opening of the accommodating cavity The accommodating cavity is fixed with a cable management structure. A sealing ring is arranged at the first opening and protrudes from the plane height of the first opening. A box body fixing structure is arranged on the outside of the box body.

6 Claims, 8 Drawing Sheets

ND OUTDOOR

CROSS-REFERENCE TO RELATED APPLICATIONS

This application claims priority to Chinese Patent Application No. 202210437142.9, filed on Apr. 25, 2022, the contents of which are herein incorporated by reference in their entireties.

TECHNICAL FIELD

The present application relates to the field of communication technology, in particular to a wall box for indoor and outdoor.

BACKGROUND

With the increasing demand for communication bandwidth, optical fibers have been widely used in wired communication networks. At present, the optical fiber network has gradually entered the home use, the optical fiber signal has entered thousands of households, and the optical fiber wall box has become a must-have item in home or office decoration. Due to the diversification of the modes used by users, it is often not convenient to route the cables due to various angles of the signal cables. Therefore, a fiber optic wall box is needed to solve the above problems. In addition, some electronic devices will be installed outdoors, which are greatly affected by the environment. The connectors used for electronic devices must have excellent protection performance. The existing connector protection boxes have no waterproof measures, which affects the safety of electronic devices.

SUMMARY

In order to overcome the deficiencies of the prior art, the present application provides a wall box for indoor and outdoor.

The technical solution adopted by this application to solve its technical problems is: A wall box for indoor and outdoor, comprising a square box body for fixing on a wall, a box cover hinged on one side of the box body and buckled on the other side, a cable reversing structure fixed to the rear side of the box body and extending out of the upper side of the box body, wherein wire inlet holes and wire outlet holes are arranged at the left and right sides of the box body, the wire inlet hole is equipped with an optical fiber connector for receiving signals, the wire outlet hole is equipped with an adapter for receiving signals, and an accommodating cavity is formed inside the box body, and the box body is provided with a first opening on the upper part of the accommodating cavity, and the box cover is covered on the upper side of the first opening of the accommodating cavity, a cable management structure is fixed in the accommodating cavity, and a sealing ring is arranged at the first opening , and the sealing ring protrudes from the plane height of the first opening of the accommodating cavity, a box body fixing structure protruding from the bottom of the box body is arranged on the outer side of the box body.

In a further technical solution, the cable reversing structure comprises a fixing panel fixed on the rear side of the box body, a positioning slot plate, a cable reversing block positioned in the positioning slot plate, a fixing bracket for fixing the cable reversing block and the positioning slot plate, wherein the positioning slot plate, the cable reversing block, and the fixing bracket are configured to be fixed on a side of the fixing panel by bolts in sequence.

In a further technical solution, the fixing panel is configured to be U-shaped, the lower part of the U-shaped fixing panel is fixed on the rear side of the box body by means of screws, two of the fixing bracket, the positioning slot plate and the cable reversing block are respectively provided, the positioning slot plate and the U-shaped fixing panel respectively have a first positioning hole and a second positioning hole, the first positioning hole and the second positioning hole are configured to communicate with each other and to be arranged on two sides of the cable reversing block, the fixing bracket is configured to pass through the first positioning hole and. the second positioning hole, so as to fix the cable reversing block to the fixing panel and the positioning slot plate.

In a further technical solution, the cable reversing block is configured as a rectangular parallelepiped and is provided with opposite first side surface and second side surface, and a bottom surface located on the lower side of the first side surface and the second side surface, and a top surface located on the upper side of the first side surface and the second side surface, a front surface located in front of the first side surface and the second side surface and a rear surface located behind the first side surface and the second side surface, the cable reversing block is provided with several threading holes passing through the first side surface and the second side surface, the threading hole is provided with a gap that leads to the top surface or the bottom surface, the cable reversing block is further provided with a first bolt hole penetrating the front surface and the rear surface, the positioning slot plate and the U-shaped fixing panel are respectively provided with a second bolt hole and a third bolt hole, and the rear part of the cable reversing block is positioned in the positioning slot plate.

In a further technical solution, the fixing bracket comprises a side plate, two limiting feet and two guarding feet extending from the periphery of the side plate, the two limiting feet are configured to respectively pass through the first positioning hole and the second positioning hole in the direction of the top surface and the bottom surface of the cable reversing block, the two guarding feet are configured to extend to the outside of the first side surface and the second side surface respectively, a fourth bolt hole is provided in the middle of the side plate, the first bolt hole, the second bolt hole, the third bolt hole, and the fourth bolt hole are configured to communicate with each other, and fix the fixing bracket, the positioning slot plate, the cable reversing block, and the fixing panel to each other by bolts.

In a further technical solution, the box body fixing structure has hanging blocks fixed on the upper and lower sides of the bottom of the box body, and a box body fixing block fixed in the middle of the bottom of the box body, the hanging block is provided with a through hanging hole, the box body fixing block is provided with a fixing block bottom that has a gap with the bottom of the box body, the fixing block bottom is provided with an arc surface that is curved towards the bottom of the box body, a fence is provided at the arc surface of the fixing block bottom, the inner wall of the accommodating cavity is provided with a reinforcing rib, and the reinforcing rib is configured such that the thickness of the first opening near the accommodating cavity is thinner than that near the bottom of the accommodating cavity.

The beneficial effect of the present application is to provide a wall box for indoor and outdoor. The box body is hung on the wall or tied to a utility pole or suspended from a load-bearing cable through the box body fixing structure, which can be assembled and used in various on-site scenarios, and has a good waterproof effect. When the signal output line and the adapter are not parallel, the direction conversion of the signal output line can be realized, and the pulling force between the signal output line and its opposite arranged adapter can be eliminated, thereby ensuring the stability of the output signal.

DETAILED DESCRIPTION

The embodiments of the present application will be described below with reference to the accompanying drawings and related embodiments, but the embodiments of the present application are not limited to the following embodiments. The present application relates to the relevant necessary components in the technical field, and should be regarded as well-known technology in the technical field, which can be known and mastered by those skilled in the technical field.

Figure 1:
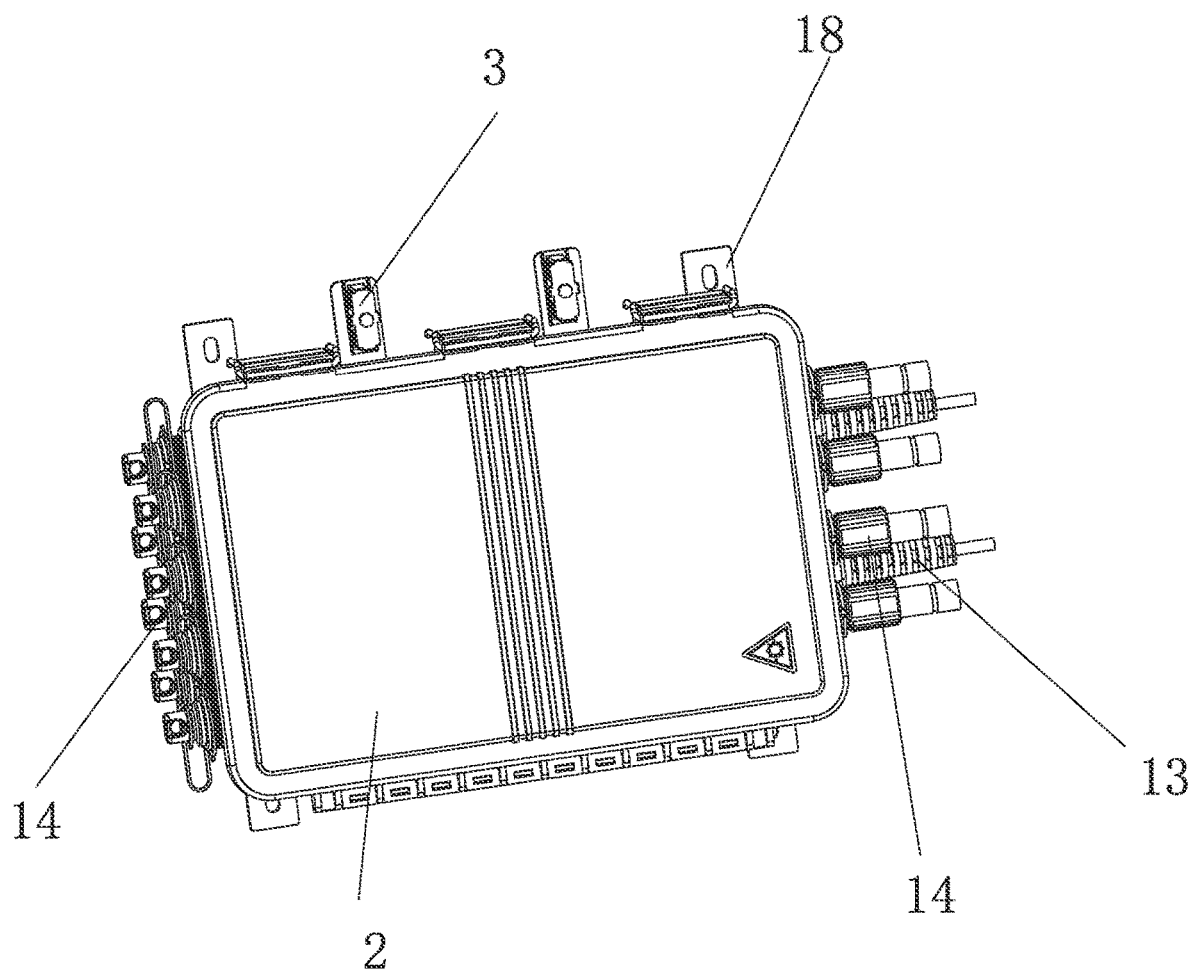
FIG. 1 is a schematic structural diagram of a wall box for indoor and outdoor according to the present application.
Figure 2:
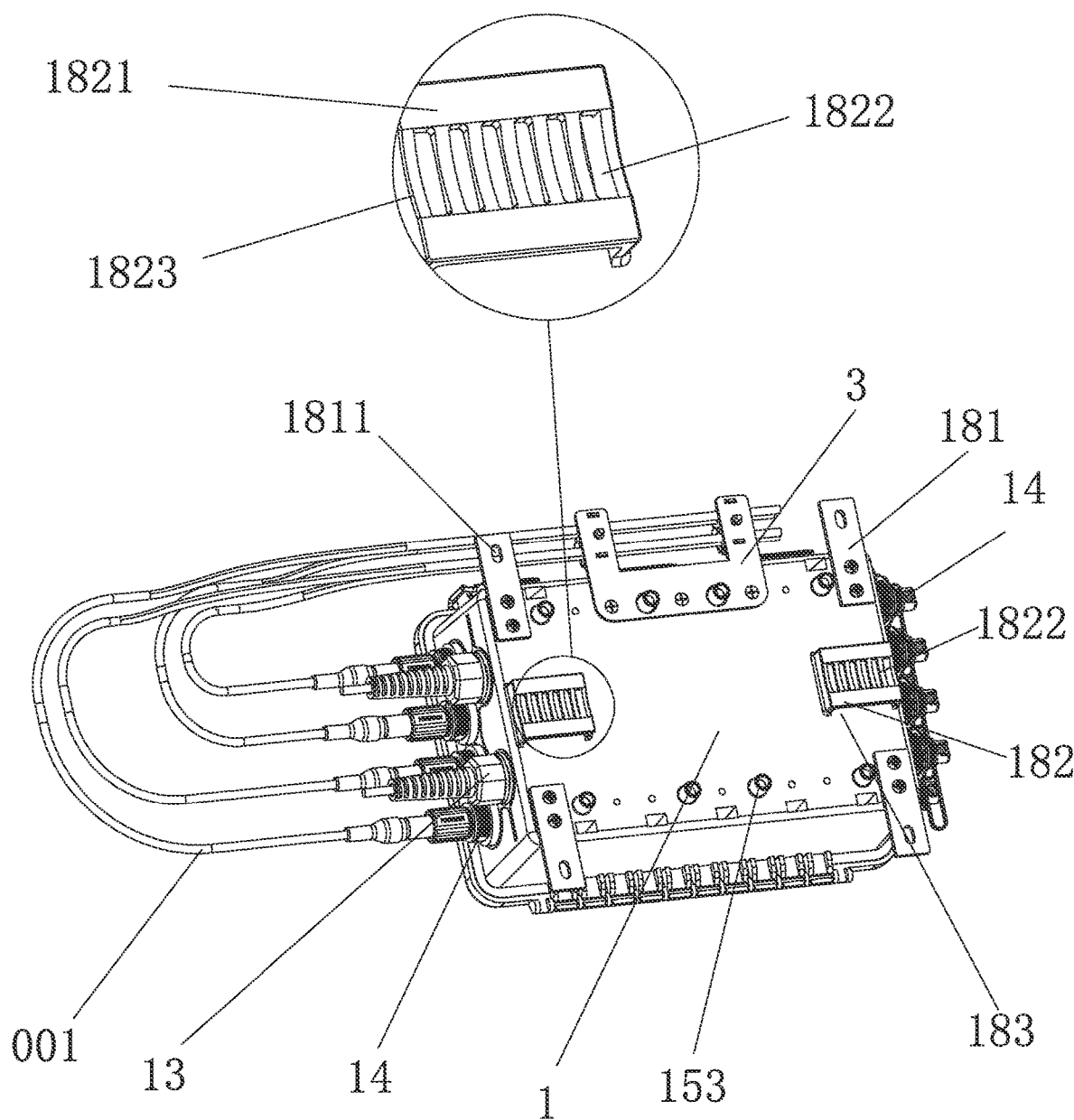
FIG. 2 is a schematic structural diagram of a wall box for indoor and outdoor in one direction according to the present application.
Figure 3:
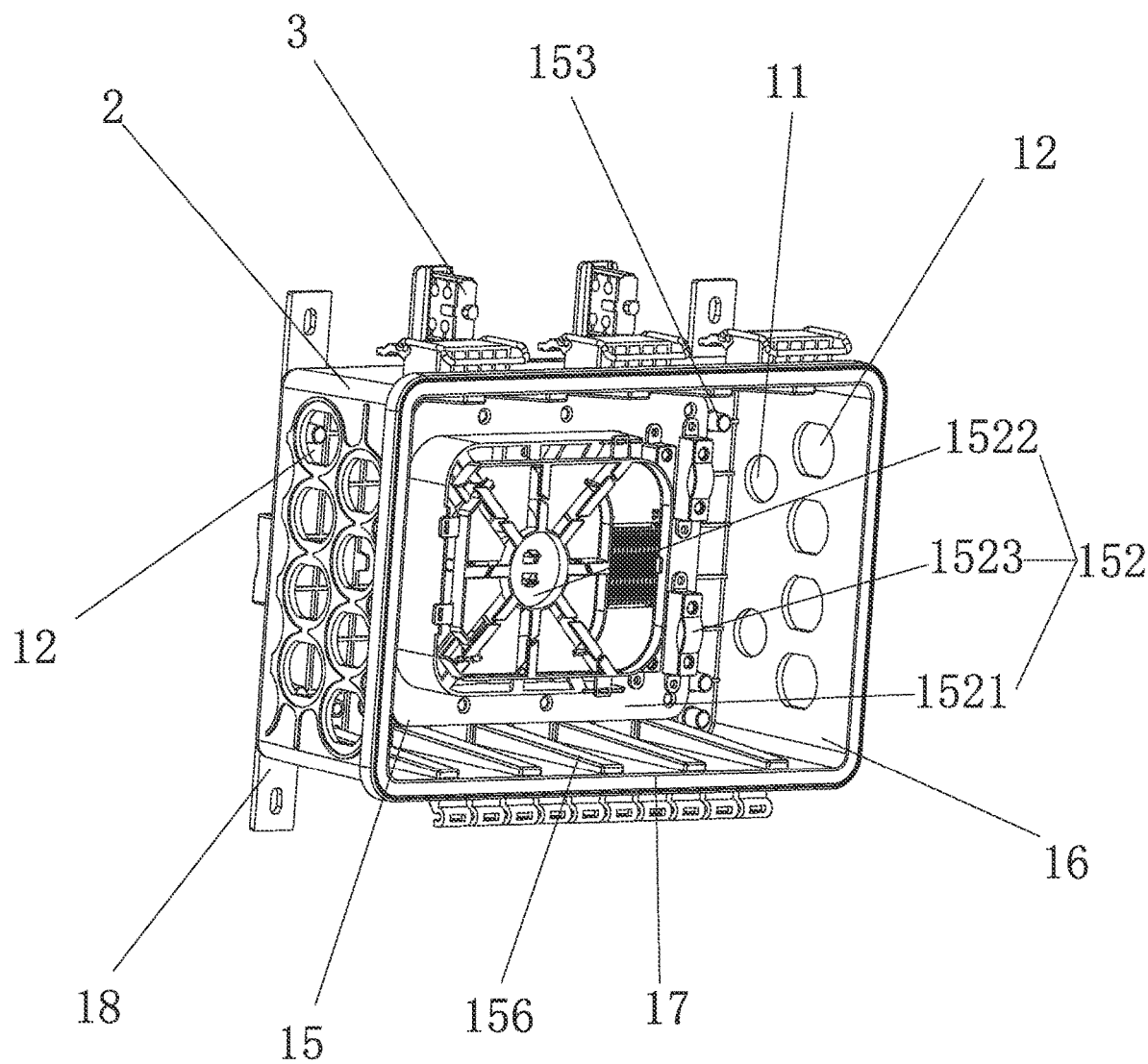
FIG. 3 is a schematic structural diagram of a wall box for indoor and outdoor according to the present application.
Figure 4:
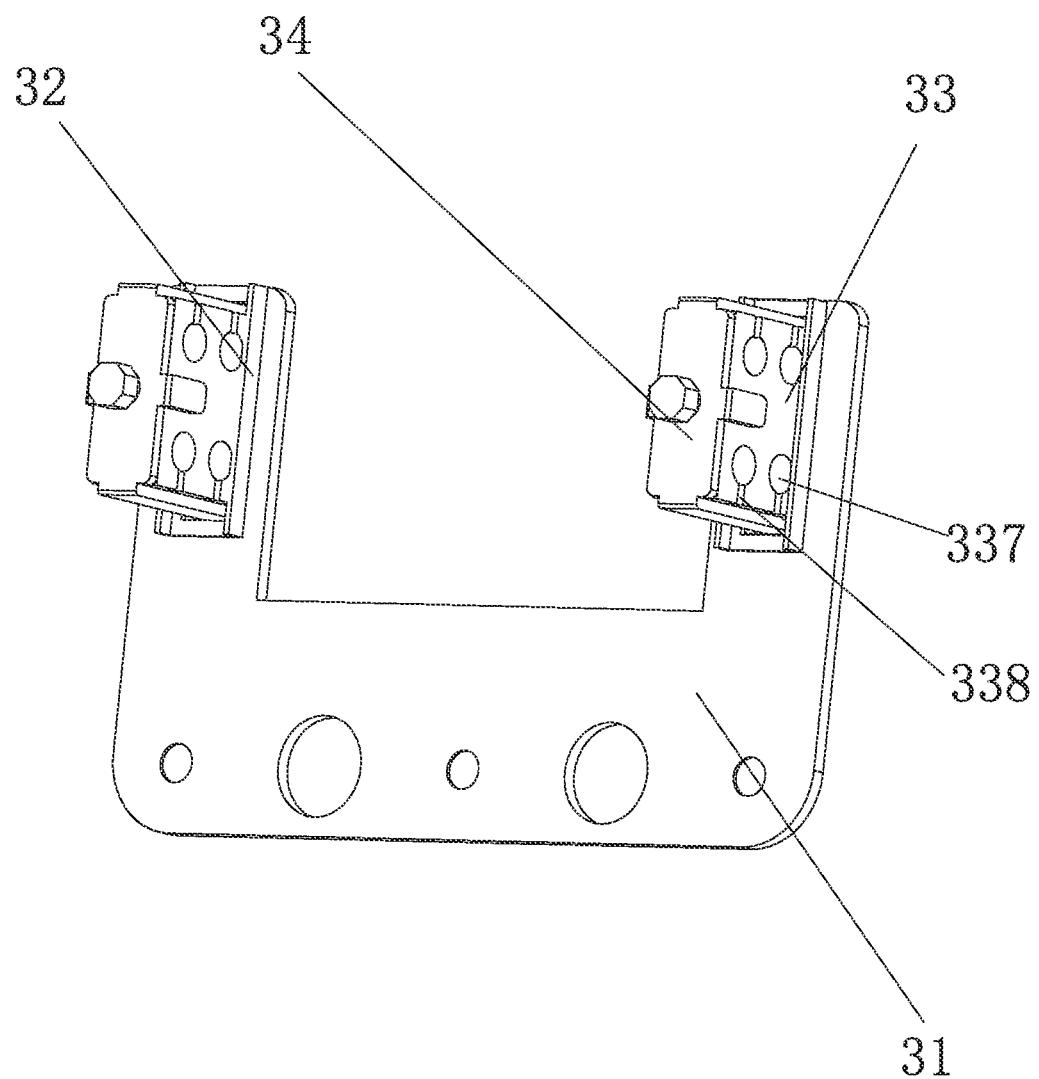
FIG. 4 is a schematic structural diagram of a cable reversing structure of a wall box for indoor and outdoor according to the present application.
Figure 5:
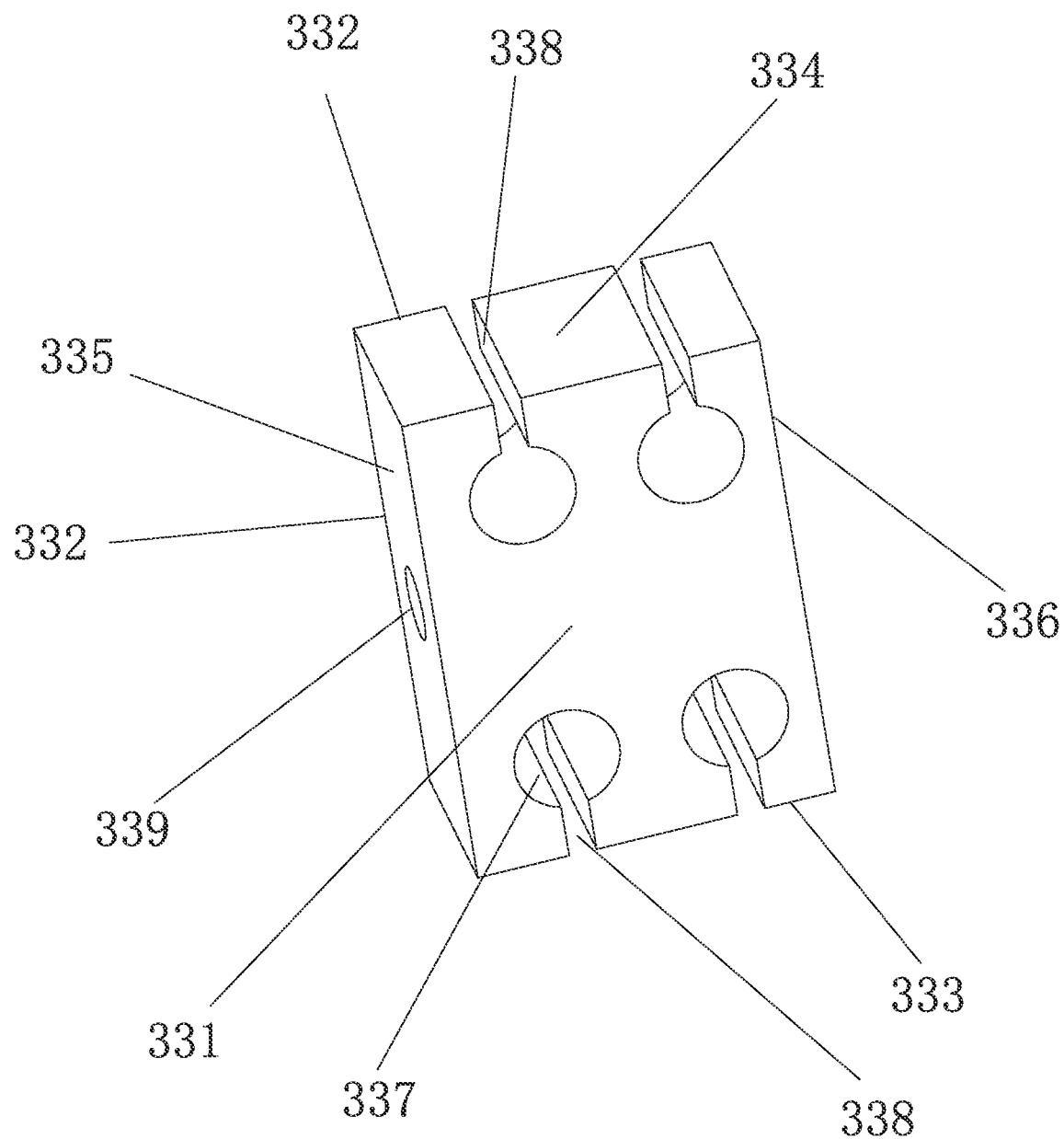
FIG. 5 is a schematic structural diagram of a cable reversing block of a wall box for indoor and outdoor according to the present application.
Figure 6:
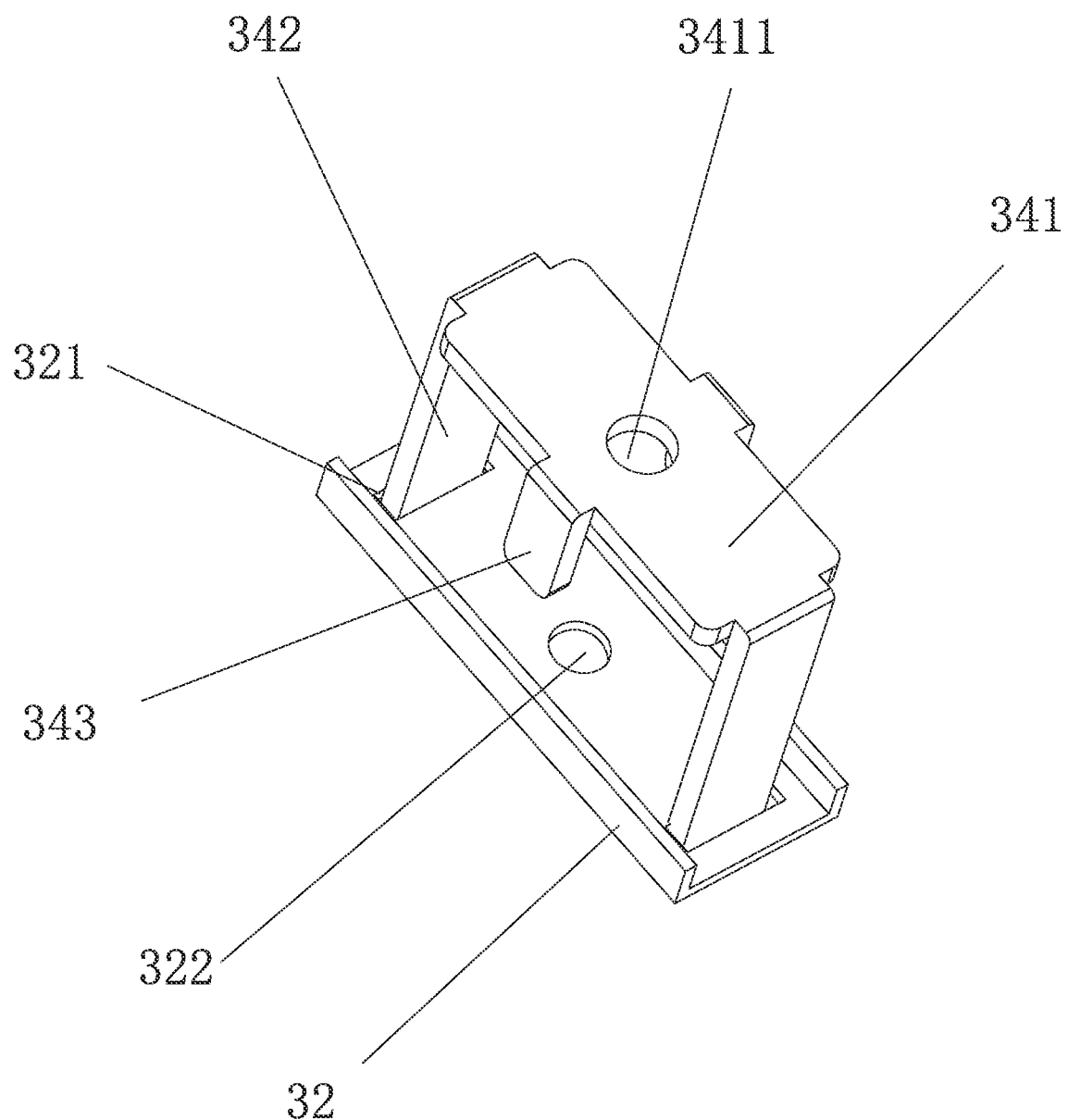
FIG. 6 is a schematic partial structural diagram of a cable reversing structure of a wall box for indoor and outdoor according to the present application.
Figure 7:
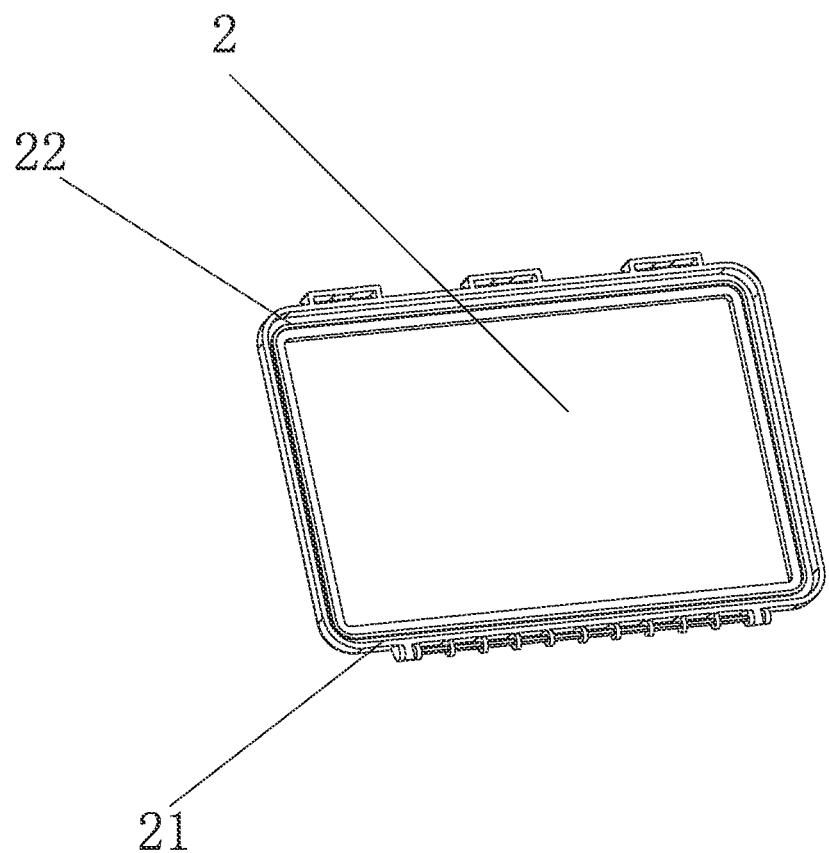
FIG. 7 is a schematic structural diagram of a box cover of a wall box for indoor and outdoor according to the present application.
Figure 8:
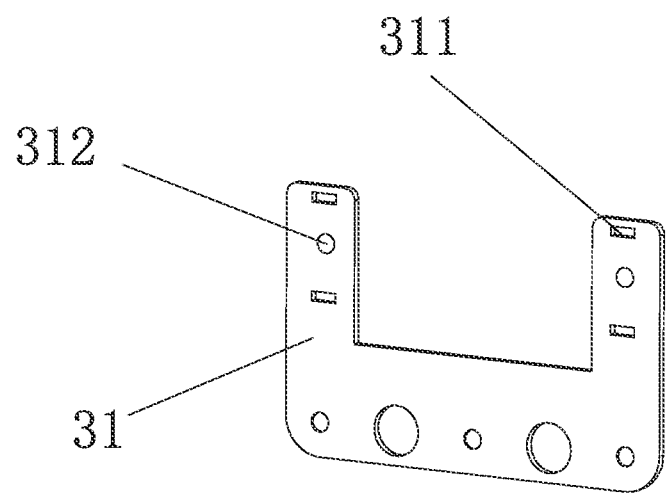
FIG. 8 is a schematic structural diagram of a fixing panel of a wall box for indoor and outdoor according to the present application.

Refer to FIGS. 1 to 8, the present application is implemented as follows: A wall box for indoor and outdoor, comprising a square box body 1 for fixing on a wall, a box cover 2 hinged on one side of the box body 1 and buckled on the other side, a cable reversing structure 3 fixed to the rear side of the box body 1 and extending out of the upper side of the box body 1, wherein wire inlet holes 11 and wire outlet holes 12 are arranged at the left and right sides of the box body 1, the wire inlet hole 11 is equipped with an optical fiber connector 13 for receiving signals, the wire outlet hole 12 is equipped with an adapter 14 for receiving signals, and an accommodating cavity 15 is formed inside the box body 1, and the box body 1 is provided with a first opening 16 on the upper part of the accommodating cavity 15, and the box cover 2 is covered on the upper side of the first opening 16 of the accommodating cavity 15, a cable management structure 152 is fixed in the accommodating cavity 15, and a sealing ring 17 is arranged at the first opening 16, and the sealing ring 17 protrudes from the plane height of the first opening 16 of the accommodating cavity 15, a box body fixing structure 18 protruding from the bottom of the box body 1 is arranged on the outer side of the box body 1.

There are two of the wire inlet holes 11 and the optical fiber connectors 13 respectively, and they are arranged on one side of the side box body 1 respectively. Twelve outlet holes 12 and adapters 14 are respectively provided, of which four are provided on the side of the box body 1 with the optical fiber connector 13, and the other eight are provided on the other side of the box body 1. Both sides of the box body 1 are provided with wire outlet holes 12 and adapters 14 to facilitate the user to select a suitable adapter 14 for use according to their needs.

When in use, the user can hang the box body 1 on the wall, or tie it to a utility pole or hang it on a load-bearing cable through the box body fixing structure 18, so as to realize assembly and use in various on-site scenarios. Insert the signal input line into the optical fiber connector 13, the cables of the optical fiber connector 13 located at one end of the accommodating cavity 15 are neatly arranged through the cable management structure 152 and spliced out several internal signal cables, and insert the internal signal cables into the ports of the adapter 14 on the inside of the accommodating cavity 15 to connect. When in use, the user can insert the signal output line 001 into any port of the adapter 14 located outside the box body 1 to complete the signal connection as needed.

When the signal output line 001 needs to be non-parallel to the outlet hole 12, in order to avoid the tension between the signal output line 001 and its corresponding adapter 14 resulting in unstable signal, the signal output line 001 needs to be fixed and then reversed for use.

The cable reversing structure 3 extending out of the upper side of the box body 1 fixes the signal output line 001 that is not parallel to the outlet hole 12, so that the signal output line 001 has space for buffering and reversing and thereby ensuring that the pulling force between the signal output wire 001 and its opposite adapter 14 is eliminated, to ensure the stability of the output signal. The box cover 2 covers the accommodating cavity 15, and the first opening 16 is provided with a sealing ring 17. The inner side of the box cover 2 is tightly fitted with the sealing ring 17 and then buckled with the box body 1, which can not only play a role in preventing of dustproof, but also play a waterproof function.

On the basis of the above embodiment, as a further preferred solution, the cable reversing structure 3 comprises a fixing panel 31 fixed on the rear side of the box body 1, a positioning slot plate 32, a cable reversing block 33 positioned in the positioning slot plate 32, a fixing bracket 34 for fixing the cable reversing block 33 and the positioning slot plate 32, wherein the positioning slot plate 32, the cable reversing block 33, and the fixing bracket 34 are configured to be fixed on a side of the fixing panel 31 by bolts in sequence.

When the signal output line 001 is not parallel to the direction of the outlet hole 12, the signal output line 001 is passed through the cable reversing block 33 to change the direction to be fixed. The cable reversing block 33 is positioned in the positioning slot plate 32 so as to be slightly loose, thereby facilitating the signal output wire 001 to pass through the cable reversing block 33. Then, the positioning slot plate 32, the cable reversing block 33, and the fixing bracket 34 are sequentially fixed on the side of the fixing plate by bolting, so that the signal output wire 001 is fixed on the cable reversing block 33, This ensures that the pulling force between the signal output line 001 and its opposite adapter 14 is eliminated, thereby ensuring the stability of the output signal On the basis of the above embodiment, as a further preferred solution, the fixing panel 31 is configured to be U-shaped, the lower part of the U-shaped fixing panel 31 is fixed on the rear side of the box body 1 by means of screws, two of the fixing bracket 34, the positioning slot plate 32 and the cable reversing block 33 are respectively provided, the positioning slot plate 32 and the U-shaped fixing panel 31 respectively have a first positioning hole 321 and a second positioning hole 311, the first positioning hole 321 and the second positioning hole 311 are configured to communicate with each other and to be arranged on two sides of the cable reversing block 33, the fixing bracket 34 is configured to pass through the first positioning hole 321 and the second positioning hole 311, so as to fix the cable reversing block 33 to the fixing panel 31 and the positioning slot plate 32.

The fixed panel 31 is U-shaped, which can save material and reduce weight without affecting the function. The fixing bracket 34, the positioning slot plate 32 and the cable reversing block 33 are respectively provided two, and are arranged on the upper side of the U-shaped fixing panel 31 to ensure that the signal output wire 001 is more stable after passing through the two cable reversing blocks 33. The first positioning hole 321 and the second positioning hole 311 are configured to communicate with each other and to be arranged on two sides of the cable reversing block 33. Loosen the bolts so that the fixing bracket 34 slightly withdraws from the second positioning hole 311 to loosen the cable reversing block 33, so that the signal output line 001 can pass through the cable reversing block 33. Tighten the bolts so that the fixing frame 34 extends into the first positioning hole 321 and the second positioning hole 311 and clamps the cable reversing block 33, thereby fixing the signal output wire 001 in the cable reversing block 33. This ensures that the signal output line 001 is more stable after passing through the cable reversing block 33.

On the basis of the above embodiment, as a further preferred solution, the cable reversing block 33 is configured as a rectangular parallelepiped and is provided with opposite first side surface 331 and second side surface 332, and a bottom surface 333 located on the lower side of the first side surface 331 and the second side surface 332, and a top surface 334 located on the upper side of the first side surface 331 and the second side surface 332, a front surface 335 located in front of the first side surface 331 and the second side surface 332 and a rear surface 336 located behind the first side surface 331 and the second side surface 332, the cable reversing block 33 is provided with several threading holes 337 passing through the first side surface 331 and the second side surface 332, the threading hole 337 is provided with a gap 338 that leads to the top surface 334 or the bottom surface 333, the cable reversing block 33 is further provided with a first bolt hole 339 penetrating the front surface 335 and the rear surface 336, the positioning slot plate 32 and the U-shaped fixing panel 31 are respectively provided with a second bolt hole 322 and a third bolt hole 312, and the rear part of the cable reversing block 33 is positioned in the positioning slot plate 32.

The cable reversing block 33 is made of polyurethane PU elastic material. The bolts pass through the fixing bracket 34 and the first bolt hole 339, the second bolt hole 322 and the third bolt hole 312 to fix the positioning slot plate 32, the cable reversing block 33 and the fixing bracket 34 on the side of the fixing panel 31. When the direction of the signal output wire 001 is not parallel to the wire outlet hole 12, loosen the bolt so that the fixing bracket 34 slightly withdraws from the first positioning hole 321 and the second positioning hole 311 to loosen the cable reversing block 33. The rear of the loosened cable reversing block 33 is positioned in the positioning slot plate 32 to ensure that the threading hole 337 is parallel to the threading hole 337. Therefore, it is ensured that the signal output wire 001 is parallel to the wire outlet hole 12 after entering the threading holes 337 of the two cable reversing blocks 33. Then tighten the bolts to fix the positioning slot plate 32, the cable reversing block 33 and the fixing bracket 34 on the side of the fixing panel 31. With tightening of the bolts, the gap 338 of the cable reversing block 33 is pressed and closed by the fixing bracket 34, so that the signal output wire 001 is fastened in the threading hole 337. This ensures that the signal output line 001 is more stable after passing through the cable reversing block 33.

On the basis of the above embodiment, as a further preferred solution, the fixing bracket 34 comprises a side plate 341, two limiting feet 342 and two guarding feet 342 extending from the periphery of the side plate 341, the two limiting feet (342) are configured to respectively pass through the first positioning hole 321 and the second positioning hole 311 in the direction of the top surface 334 and the bottom surface 333 of the cable reversing block 33, the two guarding feet 343 are configured to extend to the outside of the first side surface 331 and the second side surface 332 respectively, a fourth bolt hole 3411 is provided in the middle of the side plate 3411, the first bolt hole 339, the second bolt hole 322, the third bolt hole 312, and the fourth bolt hole 3411 are configured to communicate with each other, and fix the fixing bracket 34, the positioning slot plate 32, the cable reversing block 33, and the fixing panel 31 to each other by bolts.

When the bolts are loosened, the limiting feet 342 are slightly withdrawn from the second positioning holes 311 and the first positioning holes 321, and at the same time, the bolts are not completely withdrawn from the third bolt holes 312 of the fixing panel 31. This ensures that the cable reversing block 33 and the positioning slot plate 32 are also limited by the fixing bracket 34 in the two limiting feet 342 when the bolts are loosened. This enables the bolts to be directly tightened after the signal output wire 001 passes through the threading hole 337, thereby fixing the cable reversing block 33 and the positioning slot on the side of the fixing bracket 34.

The bottom of the accommodating cavity 15 is provided with two rows of four support columns 153, a total of eight. The cable management structure 152 comprises a support tray 1521 fixed on the upper side of the support column 153 by screws, a fiber splice tray 1522 fixed on the upper side of the support tray 1521 by screws, and a fixed wire clip 1523 fixed on the upper side of the support tray 1521 by screws and located on the side of the fiber splice tray 1522. The support tray 1521 is installed on the upper side of several support columns 153 at different positions at the bottom of the accommodating cavity 15 according to the actual needs of the cable. It is also possible to choose whether to install the fiber splice tray 1522 and the fixed wire clip 1523 according to the actual needs. In this embodiment, a fiber splice tray 1522 and a fixed wire clip 1523 are installed. The support column 153 penetrates the bottom of the box body 1 and extends to a certain height outside the bottom of the box body 1, and the support column 153 protrudes from the fixing panel 31 by a certain distance. The internal signal cables drawn from the optical fiber connector 13 in the box body 1 are fixed on the support tray through the fixed wire clip 1523, and then enter the splice tray 1522 to splicing a number of signal cables and then enter the port of the adapter 14 on one side of the accommodating cavity 15. The cables of the optical fiber connector 13 located at one end of the accommodating cavity 15 are neatly arranged through the cable management structure 152 and spliced out several internal signal cables, and insert the internal signal cables into the ports of the adapter 14 on the inside of the accommodating cavity 15 to connect. When in use, the user can insert the signal output line 001 into any port of the adapter 14 located outside the box body 1 to complete the signal connection as needed. The support column 153 protrudes from the fixing panel 31 by a certain distance to provide a certain operating space for the bolt and the guarding feet 343 to pass through the first positioning hole 321 and the second positioning hole 311.

On the basis of the above embodiment, as a further preferred solution, the box body fixing structure 18 has hanging blocks 181 fixed on the upper and lower sides of the bottom of the box body 1, and a box body fixing block 182 fixed in the middle of the bottom of the box body 1, the hanging block 181 is provided with a through hanging hole 1811. There are four hanging blocks 181 and two hanging blocks are provided on both the upper and lower sides of the bottom of the box body 1. Through the hanging hole 1811, the box body 1 can be fixed on the wall with screws or hung on a load-bearing cable. The height of the box body fixing block 182 is flush with the height at which the support column 153 penetrates the bottom of the box body 1 and extends out of the bottom of the box body 1. After the box body 1 is fixed on the wall, the fixing block 182 and the support column 153 are supported by the wall body to make the box body 1 more stable. The box body fixing block 182 is provided with a fixing block bottom 1821 that has a gap 183 with the bottom of the box body 1, the fixing block bottom 1821 is provided with an arc surface 1823 that is curved towards the bottom of the box body 1, a fence 1822 is provided at the arc surface 1 of the fixing block bottom 1821. Hang the box 1 on the wall through the fence 1822 or use a strap to pass through the fence 1822 to tie the box 1 to a utility pole. When being tied to a utility pole, the arc surface 1823 can make it fit more closely with the outside of the utility pole, so that the box body I can be tied to the utility pole more stably. The gap 183 provides a accommodating space for the hook of the wall.

The inner wall of the accommodating cavity 15 is provided with a reinforcing rib 156 to enhance the strength of the box body 1, and the reinforcing rib 156 is configured such that the thickness of the first opening 16 near the accommodating cavity 15 is thinner than that near the bottom of the accommodating cavity 15, which facilitates access to the accommodating cavity 15 when the support tray 1521 is installed.

The box cover 2 is provided with a second opening 21 covering the first opening 16, and a groove 22 is provided on the inner wall of the box cover 2 near the second opening 21.

After the box cover 2 and the box body 1 are covered and buckled, the groove 22 is fitted with the portion of the sealing ring 17 protruding from the plane height of the first opening 16 of the accommodating cavity 15. This can not only play the role of dustproof, but also play a waterproof function.

In the description of the present application, it should be noted that unless otherwise clearly specified and limited, the terms "installation", and "connection" should be understood in a broad sense, for example, it can be a fixed connection or a detachable connection, or integrally connected; it can be a mechanical connection or an electrical connection; it can be directly connected, or indirectly connected through an intermediate medium, and it can be the internal communication between two components. For those skilled in the art, the specific meaning of the above-mentioned terms in the present application can be understood according to the specific circumstances.

The present application can be assembled and used in various on-site scenarios, and has a good waterproof effect. When the signal output line 001 and the adapter 14 are not parallel, the direction conversion of the signal output line 001 can be realized, and the pulling force between the signal output line 001 and its opposite arranged adapter 14 can be eliminated, thereby ensuring the stability of the output signal.

The above descriptions are only the preferred embodiments of the present application, and it should be pointed out that for those skilled in the art, some improvements and modifications can he made without departing from the principles of the present application. These improvements and modifications should also be regarded as the protection scope of the present application.

What is claimed is:

1. A wall box for indoor and outdoor, comprising a square box body (1) for fixing on a wall, a box cover (2) hinged on one side of the box body (1) and buckled on the other side, a cable reversing structure (3) fixed to the rear side of the box body (1) and extending out of the upper side of the box body (1), wherein wire inlet holes (11) and wire outlet holes (12) are arranged at the left and right sides of the box body (1), the wire inlet hole (11) is equipped with an optical fiber connector (13) for receiving signals, the wire outlet hole (12) is equipped with an adapter (14) for receiving signals, and an accommodating cavity (15) is formed inside the box body (1), and the box body (1) is provided with a first opening (16) on the upper part of the accommodating cavity (15), and the box cover (2) is covered on the upper side of the first opening (16) of the accommodating cavity (15), a cable management structure (152) is fixed in the accommodating cavity (15), and a sealing ring (17) is arranged at the first opening (16), and the sealing ring (17) protrudes from the plane height of the first opening (16) of the accommodating cavity (15), a box body fixing structure (18) protruding from the bottom of the box body (1) is arranged on the outer side of the box body (1).

2. The wall box for indoor and outdoor according to claim 1, wherein the cable reversing structure (3) comprises a fixing panel (31) fixed on the rear side of the box body (1), a positioning slot plate (32), a cable reversing block (33) positioned in the positioning slot plate (32), a fixing bracket (34) for fixing the cable reversing block (33) and the positioning slot plate (32), wherein the positioning slot plate (32), the cable reversing block (33), and the fixing bracket (34) are configured to be fixed on a side of the fixing panel (31) by bolts in sequence.

3. The wall box for indoor and outdoor according to claim 2, wherein the fixing panel (31) is configured to be U-shaped, the lower part of the U-shaped fixing panel (31) is fixed on the rear side of the box body (1) by means of screws, two of the fixing bracket (34), the positioning slot plate (32) and the cable reversing block (33) are respectively provided, the positioning slot plate (32) and the U-shaped fixing panel (31) respectively have a first positioning hole (321) and a second positioning hole (311), the first positioning hole (321) and the second positioning hole (311) are configured to communicate with each other and to be arranged on two sides of the cable reversing block (33), the fixing bracket (34) is configured to pass through the first positioning hole (321) and the second positioning hole (311), so as to fix the cable reversing block (33) to the fixing panel (31) and the positioning slot plate (32).

4. The wall box for indoor and outdoor according to claim 3, wherein the cable reversing block (33) is configured as a rectangular parallelepiped and is provided with opposite first side surface (331) and second side surface (332), and a bottom surface (333) located on the lower side of the first side surface (331) and the second side surface (332), and a top surface (334) located on the upper side of the first side surface (331) and the second side surface (332), a front surface (335) located in front of the first side surface (331) and the second side surface (332) and a rear surface (336) located behind the first side surface (331) and the second side surface (332), the cable reversing block (33) is provided with several threading holes (337) passing through the first side surface (331) and the second side surface (332), the threading hole (337) is provided with a gap (338) that leads to the top surface (334) or the bottom surface (333), the cable reversing block (33) is further provided with a first bolt hole (339) penetrating the front surface (335) and the rear surface (336), the positioning slot plate (32) and the U-shaped fixing panel (31) are respectively provided with a second bolt hole (322) and a third bolt hole (312), and the rear part of the cable reversing block (33) is positioned in the positioning slot plate (32).

5. The wall box for indoor and outdoor according to claim 4, wherein the fixing bracket (34) comprises a side plate (341), two limiting feet (342) and two guarding feet (342) extending from the periphery of the side plate (341), the two limiting feet (342) are configured to respectively pass through the first positioning hole (321) and the second positioning hole (311) in the direction of the top surface (334) and the bottom surface (333) of the cable reversing block (33), the two guarding feet (343) are configured to extend to the outside of the first side surface (331) and the second side surface (332) respectively, a fourth bolt hole (3411) is provided in the middle of the side plate (3411), the first bolt hole (339), the second bolt hole (322), the third bolt hole (312), and the fourth bolt hole (3411) are configured to communicate with each other, and fix the fixing bracket (34), the positioning slot plate (32), the cable reversing block (33), and the fixing panel (31) to each other by bolts.

6. The wall box for indoor and outdoor according to claim 1, wherein the box body fixing structure (18) has hanging blocks (181) fixed on the upper and lower sides of the bottom of the box body (1), and a box body fixing block (182) fixed in the middle of the bottom of the box body (1), the hanging block (181) is provided with a through hanging hole (1811), the box body fixing block (182) is provided with a fixing block bottom (1821) that has a gap (183) with the bottom of the box body (1), the fixing block bottom (1821) is provided with an arc surface (1823) that is curved towards the bottom of the box body (1), a fence (1822) is provided at the arc surface (1) of the fixing block bottom (1821), the inner wall of the accommodating cavity (15) is provided with a reinforcing rib (156), and the reinforcing rib (156) is configured such that the thickness of the first opening (16) near the accommodating cavity (15) is thinner than that near the bottom of the accommodating cavity (15).

* * * * *